(No Model.) 2 Sheets—Sheet 2.

P. DEEVY.
WHEELED SCRAPER.

No. 506,212. Patented Oct. 10, 1893.

Witnesses
Inventor
Patrick Deevy
By his Attorneys,
C. A. Snow & Co.

UNITED STATES PATENT OFFICE.

PATRICK DEEVY, OF HANSEN, NEBRASKA.

WHEELED SCRAPER.

SPECIFICATION forming part of Letters Patent No. 506,212, dated October 10, 1893.

Application filed March 18, 1893. Serial No. 466,687. (No model.)

*To all whom it may concern:*

Be it known that I, PATRICK DEEVY, a citizen of the United States, residing at Hansen, in the county of Adams and State of Nebraska, have invented a new and useful Wheeled Scraper, of which the following is a specification.

My invention relates to wheeled scrapers and consists in certain improvements upon the device set forth in Letters Patent No. 346,147, granted to me July 27, 1886.

The object of my present invention is to provide a device of the class named with means whereby the shovel or scoop may be elevated or broken out of the ground with facility and with a minimum expenditure of power.

A further object of my invention is to provide means whereby the shovel or scoop is automatically locked and held for "dumping" or discharging, when dropped to its operative position.

Further objects and advantages of my invention will appear in the following description, and the novel features thereof will be particularly pointed out in the appended claims.

Figure 1:
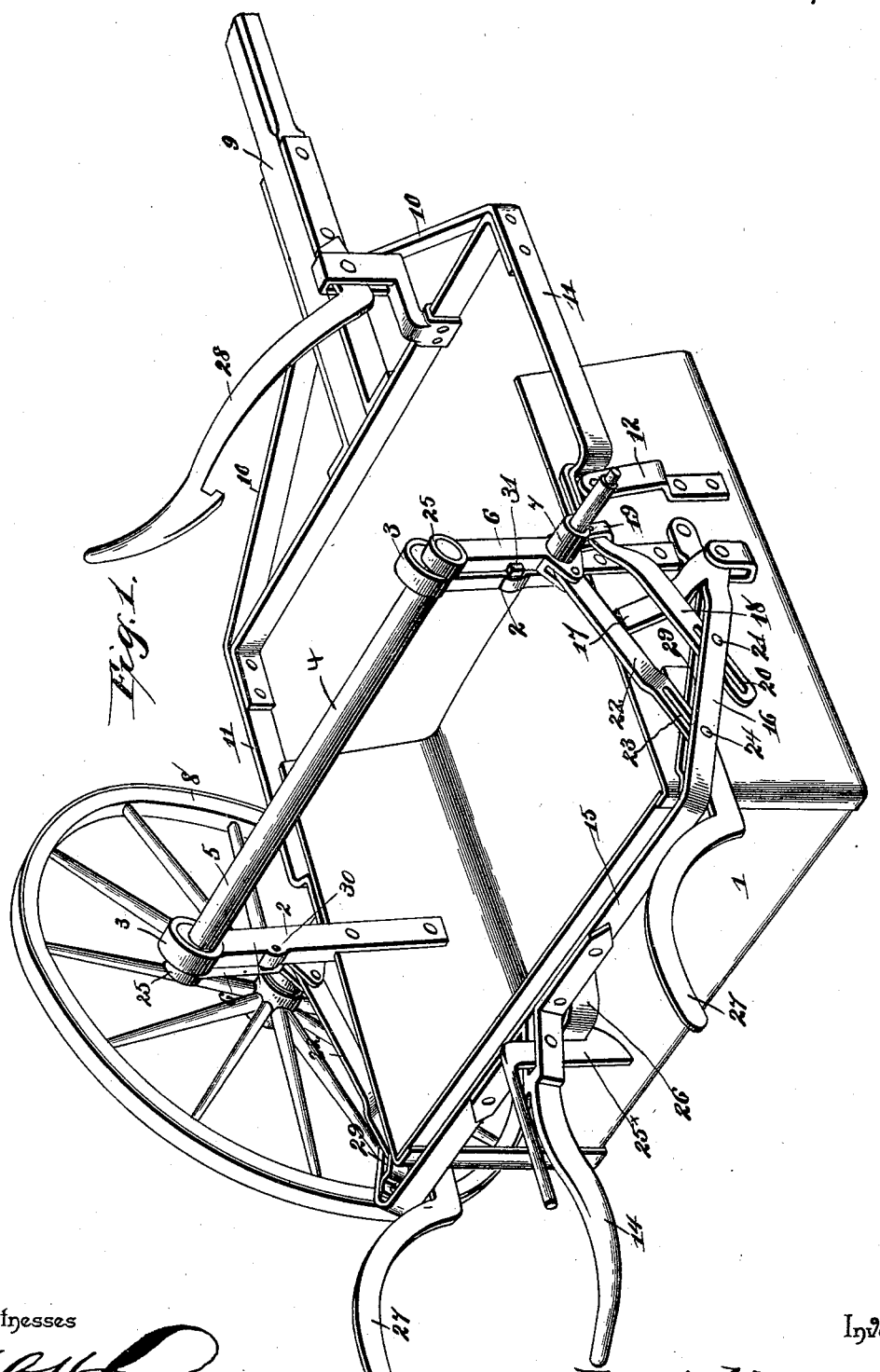
Figure 2:
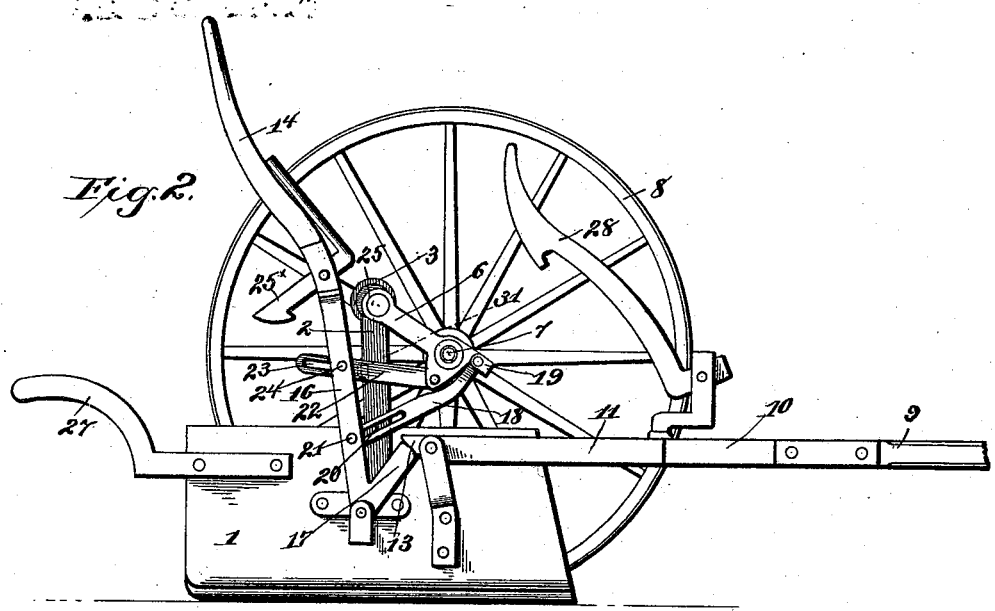
Figure 3:
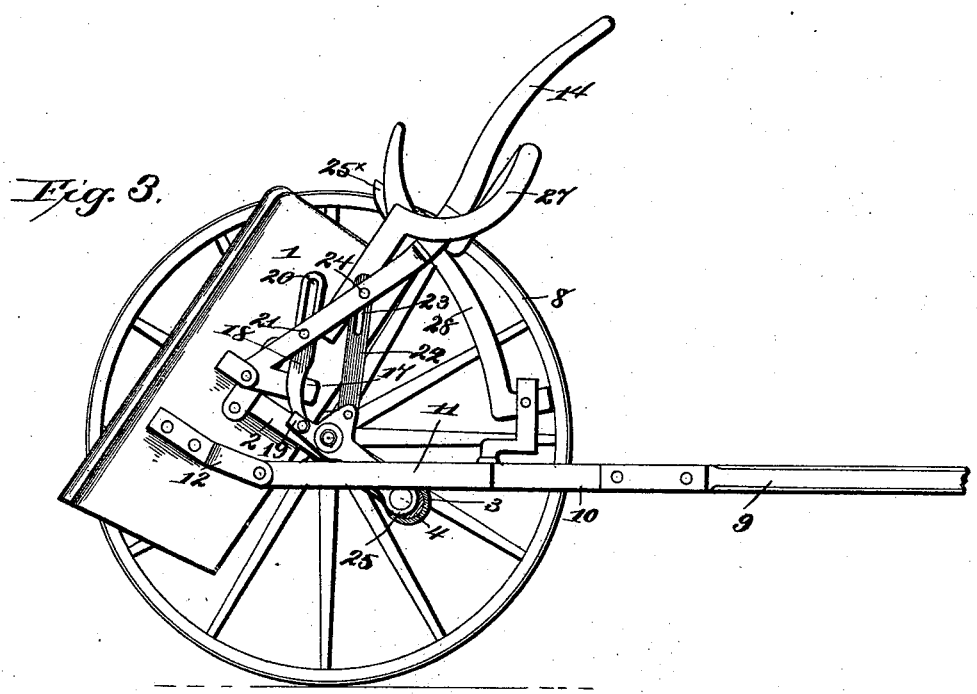

In the drawings: Figure 1 is a perspective view of a scraper embodying my improvements. Fig. 2 is a side view of the same in its depressed or operative position. Fig. 3 is a similar view with the shovel or scoop shown in the position which it assumes after the load has been discharged and while the machine is being transported from place to place.

Similar numerals refer to corresponding parts in all the figures.

1 designates the shovel or scoop, rigidly fixed to whose sides, and rising perpendicularly therefrom, are the hangers 2, provided at their upper ends with eyes or bearings 3.

4 represents a cranked-axle, the cross-bar 5 of which is mounted in said eyes or bearings 3. This cross-bar is provided with terminal crank-arms 6 which are located outside the hangers 2 and have lateral spindles 7 upon which are mounted the traction-wheels 8.

The tongue 9 is provided with a draft-iron 10 whose parallel arms 11 are pivotally connected, by means of clips 12 to the sides of the shovel or scoop in front of the hangers 2, and which are extended rearwardly from said pivotal points to form the beveled heads or extensions 13.

The operating-lever 14 is provided with a yoke 15, the arms 16 of which are pivotally connected, at their terminals to the sides of the shovel or scoop at points adjacent to the hangers 2. The arms 16 are also provided with terminal extensions which form locking-arms 17, these locking-arms being disposed at an acute angle to the plane of the yoke 15. Each arm 16 of the yoke is connected to the adjacent crank-arm of the axle by means of duplicate links. The lower link 18 is pivotally connected at its front end to the terminal of said crank-arm, such terminal, 19, being beyond the spindle 7, and is provided at its rear end with a longitudinal slot 20, which engages a pin 21, carried by the arm 16 adjacent to its pivotal point. The link 22 is pivotally connected at its front end to the crank-arm opposite or adjacent to the spindle 7 and is also provided in its rear end with a longitudinal slot 23 which engages a pin 24, which is arranged at a greater distance from the pivotal point of the arm 16 than is the pin 21. It will be noted that the lower link 18, which is connected at one end close to the pivotal point of the operating-lever and at its other end to the free end of the crank-arm, being as remote from the pivotal point or fulcrum of said crank-arm as possible, is the first to form a means of communicating the motion of the operating-lever to the crank-arm, as will be understood by reference to Fig. 2 of the drawings. The leverage afforded by this connection is preferably made as great as possible in order to facilitate the starting of the shovel in its upward movement, or breaking the same from the ground. When the shovel has been elevated to the extent possible by means of this link 18, (the movement capable of being accomplished thereby being necessarily limited, owing to its location and manner of connection) the other link, 22, is brought into play and the elevation of the shovel is continued. Thus it will be seen that these duplicate levers are brought successively into operation, to respectively start and continue the elevation of the shovel, and while the above described manner of connecting these parts is preferred, it is obvious that various equivalent means and methods may be adopted without departing from the spirit of my improvement.

The lower link 18 may, for convenience, be termed a terminal link or connection, inasmuch as it serves to connect the terminal of the crank-arm to the operating-lever adjacent to its pivotal point, and the link 22 may be termed an intermediate for the reason that it connects intermediate points of the operating-lever and crank-arm. In carrying out this part of my improvement it is essential, merely, to have a plurality of links or connections which are arranged to operate successively and which are arranged to connect the members, which are the operating-lever and the crank-arm, at varying distances from their fulcrums or pivotal points, in order to distribute the strain and provide the greater leverage when the movement is initiated, for the purposes above explained.

In addition to the above described means for elevating the shovel or scoop, I employ eccentrics 25, fixed to the cross-bar of the axle and fitting in the eyes or bearings at the upper ends of the hangers 2. These eccentrics elevate the shovel the distance of their eccentricity, and because of operating gradually they produce the additional elevation without adding perceptibly to the power required to raise the shovel the distance which can be accomplished without the use of eccentrics. While not indispensable under certain circumstances, I have found the additional elevation attainable by means of the eccentrics of advantage, in practice, and therefore I prefer to construct my improved machine as described; namely, provided with this feature. The operating-lever is provided with a pivoted latch 25$^\times$ to engage the keeper 26 upon the rear end of the shovel or scoop, when the latter is in its elevated or loaded position.

The shovel or scoop is provided with rearwardly-extending handles 27.

To hold the shovel in its dumped or transporting position I provide the ordinary retaining hook or arm 28 to engage the yoke of the operating-lever, as shown in Fig. 3.

Fig. 1 of the drawings shows the parts of my improved scraper in their elevated or loaded positions, and when it is desired to drop the shovel to its operative position, as shown in Fig. 2, the latch 25$^\times$ is disengaged from the keeper 26. As the shovel descends by gravity the free end of the operating-lever ascends until it reaches an approximately vertical position, at which point the free ends of the locking-arms 17 engage the heads or beveled extensions 13 and thus lock the shovel rigidly to the draft-iron and prevent the former from tipping and discharging its contents prematurely.

When it is desired to elevate the load to convey it to the place for dumping, the free end of the operating-lever is depressed, thereby acting successively through the links 18 and 22 and communicating motion to the crank-arms of the axle, until, when the shovel reaches the point of extreme elevation the latch 25$^\times$ engages the keeper 26. When the parts are in this elevated or loaded position the spindles are about opposite the hangers 2, thus bringing the centers of the traction-wheels about opposite the center of the shovel, whereby the latter is approximately balanced, a slight preponderance of weight being in the rear end.

When it is desired to discharge the contents of the shovel its rear end is elevated by means of the handles 27 until the yoke of the operating-lever is engaged by the retaining hook or arm 28.

The arms of the yoke are preferably slotted, as shown at 29 to form guides for the rear ends of the links 18 and 22 and the pins 21 and 24 are arranged transversely in said slot.

Changes in the form, proportion, and the minor details of construction may be resorted to without departing from the spirit or sacrificing the advantages of my invention.

In the construction illustrated in the drawings, I have also shown a device for limiting the movement of the crank-arms 6 with relation to the hangers, 2, to prevent the center of the cross-bar 5 from swinging forward beyond a vertical line passing through the center of the spindle, such device consisting of a stop, 31, provided with a stem, (not shown) which is fitted in a perforation, 30, in the hanger, 2. Various modifications of this construction may be employed to accomplish the same purpose.

The peculiar arrangement and relative positions of the slotted links, the locking-arm which is carried by the operating-lever, and the beveled extension or head of the draft-iron enable the parts, when in the operative positions as shown in Fig. 2, to be readjusted by the depression of the operating-lever to elevate the scraper or shovel without disengaging said locking-arm from the extension or head. Thus the operator is enabled, by moving the free end of the operating-lever, to elevate the scraper or shovel more or less without the risk of disengaging the locking-devices and permitting the shovel to discharge its contents. It frequently becomes necessary, or is advantageous to elevate the shovel when it encounters unusually hard soil, or when the draft is too heavy for the team, and hence the utility of the above arrangement will be readily understood.

Having thus described my invention, what I claim, and desire to secure by Letters Patent, is—

1. In a device of the class described, the combination with a cranked-axle of a shovel or scoop depending therefrom an operating-lever, and links connecting the operating-lever and arms of the axle and adapted to operate successively in communicating motion from the former to the latter, substantially as specified.

2. In a device of the class described, the combination with a cranked-axle of a pendent shovel or scoop, a pivoted operating-lever, and links 18 and 22 connecting the operating lever to the arms of the axle, substantially as specified.

3. In a device of the class described, the combination with a cranked-axle of a pendent shovel or scoop, an operating-lever pivotally connected to the shovel or scoop, and slotted terminal and intermediate links connecting said lever and the arms of the axle at different distances from their fulcrums or pivotal points, substantially as specified.

4. In a device of the class described, the combination with a cranked axle, of a pendent shovel or scoop, an operating-lever pivotally connected to the shovel or scoop, slotted terminal and intermediate links connecting said lever and the arms of the axle at different distances from their fulcrums or pivotal points, and eccentric connections between the shovel or scoop and the axle, the same consisting of eyes or bearings carried by the hangers of the shovel and eccentrics fixed to the axle and fitting in said eyes or bearings, substantially as specified.

5. In a device of the class described, the combination with a cranked-axle, a shovel or scoop provided with hangers connected to said axle, a draft-iron pivotally connected to the sides of the shovel or scoop, a pivotal operating-lever, links connecting the operating-lever to the arms of said axle, and a lock for the draft-iron comprising a locking-arm fixed to the operating-lever and arranged at an acute angle to the plane thereof, and a beveled head or extension upon the draft-iron to be engaged by said locking-arm, when the shovel or scoop is in its depressed or operative position, substantially as specified.

6. In a device of the class described, a pendent shovel or scoop, a draft-iron pivotally connected thereto and provided in rear of its fulcrum with a beveled extension or head, a locking-arm pivotally connected to the side of the shovel or scoop in position to engage said beveled extension or head when the shovel or scoop is in its operative position, an operating-lever connected to said operating-arm, and slotted terminal and intermediate links connecting the lever to the supporting-axle, whereby the shovel or scoop is capable of vertical movement to avoid obstructions without disengaging the locking-devices, substantially as specified.

In testimony that I claim the foregoing as my own I have hereto affixed my signature in the presence of two witnesses.

PATRICK DEEVY.

Witnesses:
I. A. CARRIKER,
Z. W. STONE.